United States Patent [19]

Rangeard et al.

[11] Patent Number: 4,845,476
[45] Date of Patent: Jul. 4, 1989

[54] PROXIMITY DETECTOR BETWEEN A METALLIC MASS AND AN ELEMENT TO WHICH IS APPLIED AN ELECTRIC VOLTAGE

[75] Inventors: Gilbert Rangeard, Ardelay; Jean C. Garnier, Fougeré; Jean Thomas, Chantonnay, all of France

[73] Assignee: Societe d'Assistance Technique Aux Industries Electroniques, Pneumatiques, Hydrauliqes, Chantonnay, France

[21] Appl. No.: 132,311

[22] Filed: Dec. 14, 1987

[30] Foreign Application Priority Data

Dec. 17, 1986 [FR] France ................................ 86 17666

[51] Int. Cl.$^4$ ............................................. G08B 21/00
[52] U.S. Cl. ................................. 340/660; 340/657; 361/179
[58] Field of Search ...................... 340/660, 657, 561; 324/457, 72; 361/179, 180

[56] References Cited

U.S. PATENT DOCUMENTS

| 3,309,690 | 3/1967 | Moffitt | 340/657 |
| 3,452,346 | 6/1969 | Kupersmit | 340/657 |
| 3,673,589 | 6/1972 | Barrett et al. | 340/562 |
| 3,745,549 | 7/1973 | Jepperson et al. | 340/660 |

FOREIGN PATENT DOCUMENTS

| 26505 | 3/1969 | Australia. | |
| 2023114 | 11/1970 | Fed. Rep. of Germany. | |
| 2042404 | 2/1971 | France. | |
| 2514153 | 4/1983 | France. | |
| 114774 | 6/1985 | Japan | 340/657 |

Primary Examiner—Joseph A. Orsino
Assistant Examiner—Jeffery A. Hofsass
Attorney, Agent, or Firm—Young & Thompson

[57] ABSTRACT

The present invention relates to a proximity detector between a metallic mass and an element subjected to an electric voltage, with an electric circuit feeding a safety device such as the coil controlling a circuit-breaker, the feed switch of a motor controlling the displacement of the mass, an auditory or visual alarm, or an emergency ground. The circuit includes an element which is normally non-conductive but made conductive when there is a potential appearing on the metallic mass to be protected, or on the antenna in which the electric circuit is fed by a DC autonomous power source. The conductibility of the element whose conductibility is modified by the variation of the electrostatic potential is controlled by the potential at an intermediate point between the metalic mass or the antenna and a pole of the DC source, with interposition between the intermediate point and the pole of a resistive or capacitive element.

2 Claims, 1 Drawing Sheet

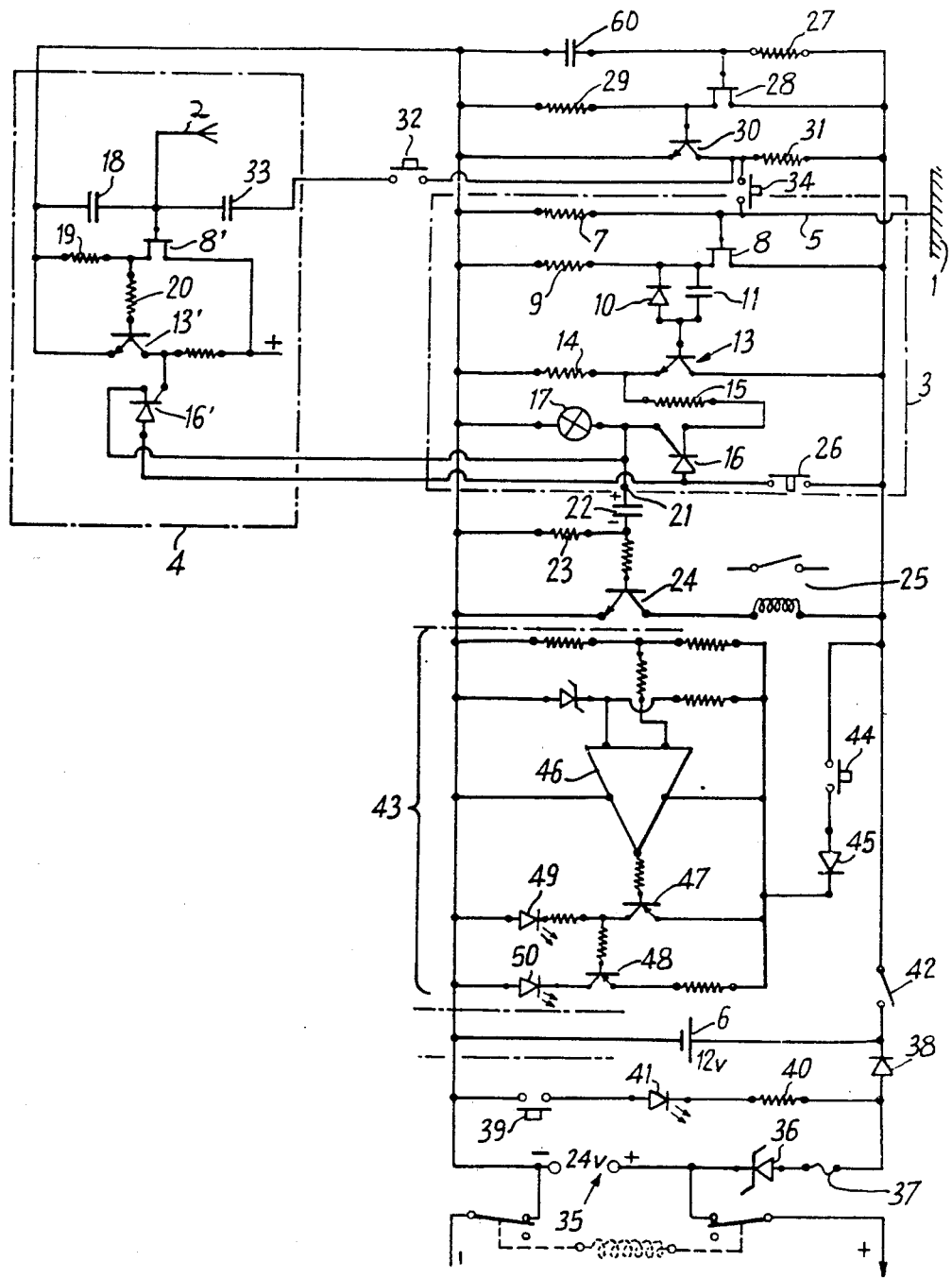

PROXIMITY DETECTOR BETWEEN A METALLIC MASS AND AN ELEMENT TO WHICH IS APPLIED AN ELECTRIC VOLTAGE

FIELD OF THE INVENTION

The present invention relates to a safety device capable of detecting the presence, in the vicinity of a metallic mass which can be in particular a public works machine, of an element subjected to an alternating electric voltage such as an electric cable and, with greater reason, the setting in contact of the mass with a source of potential.

BACKGROUND OF THE INVENTION

In many patents have already been disclosed safety devices detecting the application of a voltage to a metallic structure, the devices acting generally in parallel with a lighting arrester and providing for the control of various devices such as circuit-breakers or alarms. All of these devices have in common the fact that they use the conductivity of an element such as a diac, a phototransistor or other voltage detector when the metallic mass voltage with respect to a neutral or the ground exceeds the operating threshold of said element, whereby the current which flows through the element which has become conductive is used for controlling a safety device such as a circuit-breaker, a ground contacting system, or any other alarm system.

The design of these prior overvoltage detectors requires the existence of a neutral or ground forming the second pole of the voltage detector, the first pole being formed of the metallic mass to be protected as such or more precisely of the live conductor with which the mass comes into contact. If the devices are easily adaptable to fixed machines to which a neutral can be connected or to machines running on rails, where the rails can be connected to ground, the solution is not applicable to mobile metallic masses normally insulated from the ground such as public works machines or similar wheeled vehicles which are, more than the fixed machines, exposed to accidental contacts with live conductors.

In FR-A-No. 2,042,404 to which correspond DE-A-No. 2,023,114 and US-A-No. 3,673,589 is described a presence detector comprising an antenna connected to ground via a very large impedance, with an intermediate point between the resistors in series the potential variation of which is used for controlling the conductibility of a field-effect transistor. This presence detector detects in fact the capacitance variation between the antenna or probe and the ground, under the capacitive effect of a mass, i.e. that of the intruder, which penetrates the space separating the armatures, antenna and ground. In addition to the fact that such a device requires, just as the hereabove safety devices, a contact with the ground, it would not be usable on a mobile machine since the capacitance value between the probe and the ground varies continuously as a function of the displacement, and this would cause a permanent alarm. In fact, this patent provides for a capacitor and resistor series circuit in order to make it insensitive to the charge variations of the antenna which could be produced by electric fields.

OBJECTS AND SUMMARY OF THE INVENTION

Therefore, the object of the present invention is to provide a proximity detector of an element subjected to an electric voltage adapted for protecting a mobile metallic mass insulated from the ground such as a public works machine. It is obvious that the detector can also protect a fixed and non-insulated metallic mass, since the detector is of an autonomous conception and has only a single contact with the metallic mass to be protected and/or an antenna associated with the portion of the mass which is likely to come in the vicinity of the live conductor. Moreover, the device detects not only the proximity but also a contact of the mass with a live element.

The present invention has as its object a proximtiy detector between a metallic mass and a live element comprising an electric circuit feeding a safety device such as the control coil of a circuit-breaker, the power supply switch of a motor controlling the displacement of the mass, an auditory or visual alarm, or an emergency grounding. The circuit includes a variable conductibility element having a conductibility modified by the variation of the electrostatic potential applied to the metallic mass to be protected or to the antenna, characterized in that the electric circuit is fed by a DC autonomous power supply source, the conductibility of the element whose conductibility is modified by the variation of the electrostatic potential being controlled by the potential at an intermediate point between the metallic mass to be protected or the antenna and a pole of the DC source, with interposition between the intermediate point and the pole of a resistive or capacitive element.

According to a preferential embodiment applicable in particular to the detection of alternating voltages, the element of the circuit which provides for the detection of the potential is made of a field-effect transistor the gate of which is connected to an intermediate point between the metallic mass or the antenna and a pole of the DC source, with the interposition between the intermediate point and the pole of a resistive or capacitive element, the source-drain circuit of the field-effect transistor being polarized by the DC source. The source-drain circuit of the field-effect transistor is polarized by the DC power supply voltage and the gate is connected to one of the feeding poles via a resistive or capacitive element. When the protected mass is insulated, the voltage applied to the gate is that of the pole which also polarizes the transistor source and the transistor is not conductive. If, on the contrary, the gate voltage varies because the current passes through the resistive or capacitive element from the power supply pole to the mass or to the antenna to which is applied a voltage different to that of the pole by a direct contact or a capacitive effect, the polarization of the gate will be positive or negative with respect to that of the source, and the transistor will become conductive by enrichment or depletion.

According to a preferential embodiment, the current flowing through the field-effect transistor controls the polarization of the base of a bi-polar transistor acting as an amplifier and the current of the bipolar transistor determines the voltage applied to the gate of a thyristor whose output current forms the control current for the safety device.

BRIEF DESCRIPTION OF DRAWINGS

Hereafter will be described an embodiment of the proximity detector according to the invention, with reference to the accompanying drawing representing the electric diagram thereof.

DETAILED DESCRIPTION OF THE INVENTION

In the drawing, reference numeral 1 designates the metallic mass to be protected, such as the chassis of the machine, which is in danger of being brought to an abnormal potential through contact with a live conductor such as an electric wire or an underground cable. Reference numeral 2 designates an antenna acting via a capacitive effect when at a distance from a high voltage conductor, which can reach for example three meters.

The chain-dot line frame 3 surrounds the portion of the detector which detects the contact of mass 1 with a live conductor and the other frame 4 surrounds the portion of the detector which detects by capacitive effect the proximity between antenna 2 and a live conductor.

Portion 3 includes a conductor 5 connected to the negative pole of a DC power source, for example a 12 volt battery 6, via a resistor 7. When mass 1 is insulated, conductor 5 is at −12 V and this voltage applied to the gate of the field-effect transistor 8 which is connected, with the interposition of a charge resistor 9, between the + and − poles of battery 6, maintains the transistor in the non-conductive state. If mass 1 is brought to a positive or a negative potential which is different from −12 V, a current will flow through resistor 7 and the gate will be at a potential different from the polarization potential of the transistor between source and drain, thereby causing conduction by enrichment or depletion.

The current flowing through transistor 8 is rectified and stabilized by a diode 10 and a capacitor 11 and connected to the base of an n-p-n transistor 13. The current flowing through transistor 13 is connected via a charging resistor 14 and a current-limiting resistor 15 to the gate of a thyristor 16 connected between the two poles of battery 6. Thus thyristor 16 delivers a current which lights up an indicator 17 as soon as mass 1 is in contact with a live conductor.

Portion 4 of the detector also includes a field-effect transistor 8' which controls an n-p-n transistor 13' producing a current used for firing a thyristor 16'. As antenna 2 operates through a capacitive effect, the control by a voltage of the gate of the field-effect transistor 8' is ensured by interposing a capacitor 18 between the polarization pole of battery 6 and the point common to antenna 2 and the gate of transistor 8'. The current flowing through transistor 8' is distributed via a resistor bridge 19-20 to the base of n-p-n transistor 13' the current of which controls the gate of thyristor 16'. Thyristor 16' is connected in parallel with thyristor 16 to indicator 17 and to the output 21 of the two direct contact and capacitive effect detecting portions.

The output from terminal 21 provides for the charge of a capacitor 22 through a charging resistor 23 and the charging current is directed to the base of an n-p-n transistor 24 connected to the circuit of the coil of a delayed relay 25 which can control for example the opening of the electrovalve controlling the projection toward the ground of a jet of water from a reserve of water under pressure electrically connected to the machine chassis.

The object of circuit breaker 26 is to bring back the detecting portions to a non-operative position after their normal operation or for carrying out a test. The test can be carried out by a test-generator supplying a voltage of sufficient value and made of a capacitor 60 in series with a resistor 27 between which is connected the gate of a field-effect transistor 28 whose current, branched off via a resistor 29, is applied to the base of an n-p-n transistor 30. The voltage appearing between the emitter of transistor 30 and a charging resistor 31 can be applied, via a switch 32, to a capacitor 33 connected in parallel with antenna 2 to the gate of transistor 8' or via a switch 34 to the mass 1.

The electric diagram includes moreover a charging circuit for battery 6, connected to the vehicle battery via a relay 35 controlled by the vehicle switch key, a Zener diode 36 in series with a fuse 37 and a rectifying diode 38. The charge state of the vehicle battery may be checked via a switch 39 in series with a resistor 40 and an electroluminescent diode 41.

The connection of battery 6 to the circuit is via a switch 42. The charge state of battery 6 can be controlled by a circuit of known type designated as a whole by reference numeral 43 and connected by a switch 44 in series with a diode 45 to the power supply of the positive pole. The output of operational amplifier 46 controls two n-p-n transistors 47 and 48, the currents of which light up the electroluminescent diode 49 when the voltage of battery 6 is normal and the electroluminescent diode 50 when this voltage is too low.

The hereabove described embodiment is liable to various modifications without departing from the scope of the accompanying claims, and there can be for example only one of the two detecting portions 3 and 4.

What is claimed:

1. In a proximity detector for detecting the proximity of a metallic mass to a live element including an electric circuit for feeding a safety device such as the control coil of a circuit breaker, the power supply switch of a motor controlling displacement of the mass, an alarm, an emergency ground and the like, the improvement wherein
    said circuit includes
    (a) a DC power supply source (6);
    (b) first sensing means (5) for producing a first electrostatic potential upon direct contact of the mass with the live element;
    (c) second sensing means (2) for producing a second electrostatic potential when the mass is in close proximity to the live element;
    (d) field effect transistor means (8, 8') for detecting the first and second electrostatic potentials, said field effect transistor means including plural gate means each connected with a terminal of said first and second sensing means respectively and with a pole of said DC power supply source, said field effect transistor means also including a sourcedrain circuit polarized by said DC power supply source;
    (e) a resistive element (7) connected between said pole and said terminal of said first sensing means; and
    (f) a capacitive element (18) connected between said pole and said terminal of said second sensing means, whereby when at least one of said first and second potentials is altered, the conductibility of said field effect transistor means is modified to produce an output to the safety device.

2. Apparatus as defined in claim 1, and further comprising
(g) bipolar transistor means (13, 13′) connected with said field effect transistor means for producing a current in response to the modified conductibility of said field effect transistor means; and
(h) thyristor means (16, 16′) connected with the output of said bipolar transistor means for producing an output to the safety device in response to the current of said bipolar transistor means.

* * * * *